United States Patent [19]

Nosaki et al.

[11] Patent Number: 5,800,638
[45] Date of Patent: Sep. 1, 1998

[54] ULTRAFINE PARTICLE OF QUASI-CRYSTALLINE ALUMINUM ALLOY AND PROCESS FOR PRODUCING AGGREGATE THEREOF

[75] Inventors: Katsutoshi Nosaki, Saitama; Tsuyoshi Masumoto, 8-22, Kamisugi 3-chome, Aoba-ku, Sendai-shi, Miyagi; Akihisa Inoue, Kawauchi Jutaku, 11-806, Kawauchi, Aoba-ku, Sendai-shi, Miyagi; Tadashi Yamaguchi, Sendai, all of Japan

[73] Assignees: Akihisa Inoue; Tsuyoshi Masumoto, both of Miyagi; YKK Corporation; Honda Giken Kogyo Kabushiki Kaisha, both of Tokyo, all of Japan

[21] Appl. No.: 313,464

[22] Filed: Sep. 27, 1994

[30] Foreign Application Priority Data

Sep. 29, 1993 [JP] Japan .................... 5-265591

[51] Int. Cl.$^6$ .................... C22C 21/00
[52] U.S. Cl. .................... 148/403; 420/528; 502/333; 502/339
[58] Field of Search .................... 420/528, 550; 148/400, 403; 502/333, 339, 355

[56] References Cited

U.S. PATENT DOCUMENTS

| | | | |
|---|---|---|---|
| 3,428,490 | 2/1969 | Bravo et al. | 136/86 |
| 4,595,429 | 6/1986 | Le Caër et al. | 148/403 |
| 4,710,246 | 12/1987 | Le Caër et al. | 148/403 |
| 5,128,081 | 7/1992 | Siegel et al. | 264/115 |
| 5,204,191 | 4/1993 | Dubois et al. | 148/438 |
| 5,397,490 | 3/1995 | Masumoto et al. | 420/528 |

FOREIGN PATENT DOCUMENTS

| | | |
|---|---|---|
| 561375 | 9/1993 | European Pat. Off. . |
| 582260A1 | 2/1994 | European Pat. Off. . |

OTHER PUBLICATIONS

Article entitled "Atoms, Molecules and Clusters", vol. 12, No. 1–4 1989 by Zeitschrift fur Physik D. (Springer International).

Article "Quasicrystals in Rapidly Solidified Alloys of Al–Pt Group Metals—IV, Quasicrystals in Rapidly Solidified Al–Pd and Al–PT Alloys", by L. Ma, R. Wang and K.H. Kuo; Journal of the Less–Common Metals, 163 (1990) 37–49.

Article "Structure Investigations on al$_7$ ... ", by Bakel et al, Colloque De Physique, Supplement No. 11, Tome 50, Nov. 1989.

Article "Formulation, microstructure, chemical long-range order, a nd stability of quasicrystals in Al–Pd–Mn alloys"; by An Pan Tsai et al., J. Mater, Res., vol. 6 No. 12 Dec. 1991 (Materials Research Society).

Japanese Journal of Applied Physics, Part 1, Sep. 1991, vol. 30, No. 9A, "Formation of Decagonal Quasicrystal in the Al–Pd–Mn System and Its Structure", by Hiraga et al.

Article entitles "Decagonal quasicrystals with different periodicities along the tenfold axis in rapidly solidified Al$_{65}$Cu$_{20}$M$_{15}$ (M=Mn, Fe, Co or Ni)" by L.X. He, Y.K. Wu and K.H. Kuo, J. of Materials Science Letters 7 (1988) 1284–86.

(List continued on next page.)

*Primary Examiner*—George Wyszomierski
*Attorney, Agent, or Firm*—Lyon & Lyon LLP

[57] ABSTRACT

Quasi-crystalline aluminum alloy ultrafine particles are produced by a gas-phase reaction and consist of at least one alloy element from the group of V, Cr, Mn, Fe, Co, Ni, Cu and Pd, for example palladium (Pd) in an amount represented by 20 atomic %$\leq$Pd$\leq$30 atomic %, and the balance of aluminum. Palladium has a catalyst power, and the ultrafine particles have a large specific surface area, because they have a particle size d$\leq$200 nm. Such ultrafine particles have a high catalytic activity in a methanol decomposing reaction and also have a good retention of catalytic activity.

9 Claims, 9 Drawing Sheets

OTHER PUBLICATIONS

Article, "Ductile Al–Cu–V Amorphous Alloys without Metalloid" by An–Pang Tsai, Akihisa Inoue, and Tsuyoshi Masumoto (Metallurgical Transactions A, vol. 19A, Feb. 1988).

Article, "Stable Decagonal Al–Co–Ni and Al–Co–Cu Quasicrystals" by An–Pang Tsai, Akihisa Inoue and Tsuyoshi Masumoto (Materials Transactions, JIM, vol. 30 No. 7 (1989), pp. 463 to 473).

Article entitled "Quasicrystals in Rapidly Solidified Alloys of Al–Pt Group Metals—I. An Overview of Quasicrystals in Aluminum–Transition Metal Alloys"; (1990)—Journal of the Less–Common Metals, pp. 9–17.

Sadoc and Dubois, "On the Local Structure in Icosahedral AlPdMn Quasicrystals," *Journal of Non–Crystalline Solids* 153&154 (1993) pp. 83–85 (North Holland).

ULTRAFINE PARTICLE OF QUASI-CRYSTALLINE ALUMINUM ALLOY AND PROCESS FOR PRODUCING AGGREGATE THEREOF

BACKGROUND OF THE INVENTION

1. Field of the Invention

The present invention relates to an ultrafine particle of quasi-crystalline aluminum alloy and a process for producing an aggregate thereof.

As used herein, the term "quasi-crystalline aluminum alloy" generally means an aluminum alloy having a symmetry in five rotations, which is not present in a usual crystal, and also having a regular 20-hedral structure, i.e., having a structure intermediate between a crystalline aluminum alloy and an amorphous aluminum alloy. The quasi-crystalline aluminum alloys include those having a metastable phase and those having a stable phase. The quasi-crystalline aluminum alloy having the metastable phase is phase-transformed at a crystallization temperature Tx into a crystalline phase which is a stable phase, while the quasi-crystalline aluminum alloy in the form of the stable phase is maintained stably at a quasi-crystalline structure up to its melting point.

2. Description of the Prior Art

The quasi-crystalline aluminum alloy has been conventionally produced by either a liquid quenching process employing a single roller melt spinning technique, or a mechanical alloying process.

When the quasi-crystalline aluminum alloy is used as a catalyst material, a magnetic material or the like, it is necessary to form the quasi-crystalline aluminum alloy into extremely fine particles in order to enhance its properties.

By the liquid quenching process, however, the quasi-crystalline aluminum alloy is of a ribbon shape and hence, even if it is pulverized, the resulting particles have a diameter of 1 to 10 μm or more. On the other hand, even with the mechanical alloying process, particles having a particle size of micro-order are only produced. Therefore, the particles of quasi-crystalline aluminum alloy produced in the prior art processes cannot possibly meet the demand for an extreme reduction in particle size.

SUMMARY OF THE INVENTION

It is an object of the present invention to provide a process for producing ultrafine particles of quasi-crystalline aluminum alloy and an aggregate thereof, which are most suitable for a catalyst material, a magnetic material or the like.

To achieve the above object, according to the present invention, there is provided ultrafine particles of a quasi-crystalline aluminum alloy, which consists of palladium (Pd) in an amount represented by 20 atomic %$\leq$Pd$\leq$30 atomic %, and the balance of aluminum. Such Al-Pd based quasi-crystalline aluminum alloy ultrafine particles are effective for use as a catalyst material, because they have a specific surface area increased by the reduction in particle size and contain palladium that has a catalytic power.

For the catalyst material, the degree of unsaturation (non-bondability) of the component element thereof is preferably large. The degree of unsaturation is increased in the order of first, crystalline, second, quasi-crystalline and third, amorphous alloy ultrafine particles. Therefore, an amorphous structure is the most preferred as the catalyst material, but is poor in high temperature stability, because the amorphous structure is easily transformed to a crystalline structure at a high temperature. On the other hand, the quasi-crystalline aluminum alloy having the above-described composition has a metastable phase and is maintained at the quasi-crystalline structure up to a temperature of 870 to 940 K and therefore, has an excellent high temperature stability.

In addition, according to the present invention, there is provided ultrafine particles of a quasi-crystalline aluminum alloy, consisting of palladium (Pd) in an amount represented by 15 atomic %$\leq$Pd$\leq$30 atomic %, a transition element (excluding Pd) in an amount $\leq$17 atomic %, boron in an amount equal to or smaller than 10 atomic %, and the balance of aluminum.

Such Al-Pd-transition element-B based quasi-crystalline aluminum alloy ultrafine particles have excellent magnetic properties and are therefore useful as magnetic materials. They are most suitable as a magnetic fluid because they are ferromagnetic and are converted into single-magnetic domain particles with an extreme reduction in particle size. In addition, they also have a catalytic activity as palladium is contained therein. The quasi-crystalline aluminum alloy having such a composition is maintained as a quasi-crystalline structure up to a temperature of 1100 to 1350 K when it has a stable phase, up to a temperature of 870 to 940 K when it has a metastable phase, and hence, such quasi-crystalline aluminum alloy has an excellent high temperature stability. The same is true of a ternary or more quasi-crystalline aluminum alloy.

The concept or term "quasi-crystalline aluminum alloy" includes not only an aluminum alloy having a single quasi-crystalline phase texture, but also aluminum alloys having mixed-phase textures containing a quasi-crystalline phase and a crystalline phase, a quasi-crystalline phase and an amorphous phase, as well as a combination of a quasi-crystalline phase, a crystalline phase and an amorphous phase. In this case, it is desirable that the volume fraction Vf of the quasi-crystalline phase is at least 50% (Vf$\geq$50%). The term "ultrafine particles" refers to those having a particle size d, for example, of at most 200 nm (d$\leq$200 nm).

Further, to achieve the above object, according to the present invention, there is provided a process for producing an aggregate of quasi-crystalline aluminum alloy ultrafine particles, comprising the steps of preparing a material whose constituents are controlled to form a quasi-crystalline aluminum alloy by a gas-phase reaction of aluminum with at least one alloy element selected from the group consisting of V, Cr, Mn, Fe, Co, Ni, Cu and Pd, and melting the material by plasma arc in an atmosphere containing a gas inert to the aluminum and the alloy elements, thereby realizing the evaporation of a large number of clusters having a quasi-crystalline aluminum alloy composition containing aluminum and the alloy element, and the subsequent formation of droplets by the aggregation of the clusters.

With the above producing process, it is possible to easily produce the aggregate of ultrafine particles of quasi-crystalline aluminum alloy in the single melting step. The boiling points of the aluminum and alloy element are relatively similar and therefore, it is possible to control the particle size of the quasi-crystalline aluminum alloy ultrafine particles by the melting temperature. Further, the quasi-crystalline aluminum alloy ultrafine particles are produced under the gas-phase reaction and therefore, cannot be agglomerated and are of a high purity.

Ultrafine particles can still be produced even when an element having a boiling point considerably higher than that of aluminum is selected, because forced evaporation is carried out by the plasma arc melting. Hence, if such an element having a higher boiling point is contained, for example, in an amount on the order of 10 atomic % in the starting material, that element can be contained in an amount on the order of at most 5 atomic % in the resulting ultrafine particles.

The above and other objects, features and advantages will become apparent from the following description of a preferred embodiment taken in conjunction with the accompanying drawings.

DESCRIPTION OF THE PREFERRED EMBODIMENT

Figure 1A:
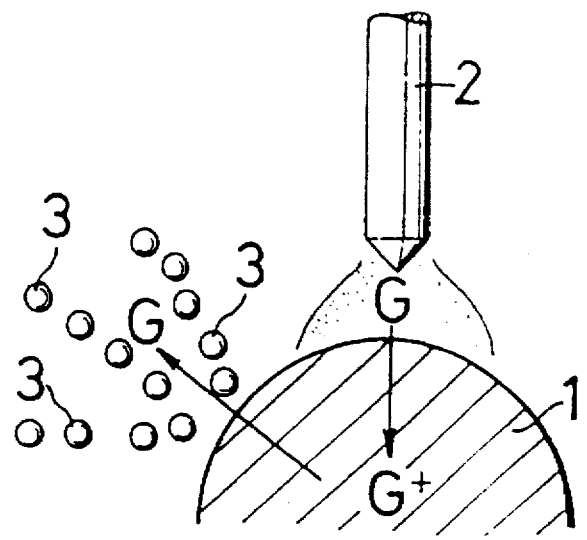
FIG. 1A is a diagram for illustrating the generation of clusters in a mechanism for forming quasi-crystalline aluminum alloy ultrafine particles according to this invention.

Quasi-crystalline aluminum alloy ultra fine particles (each of which will be referred to as "qc-AP") are composed of aluminum and at least one transition element (TE), or aluminum, at least one TE and boron (B). Transition elements which may be used include V, Cr, Mn, Fe, Co, Ni, Cu and Pd.

The qc-APs are a product resulting from a gas-phase reaction of aluminum and at least one of the above-described alloy elements. The boiling points of the individual elements are relatively approximate to one another.

Table 1 shows the boiling points (K) of the elements.

TABLE 1

| Element | Boiling point (K.) | Element | Boiling point (K.) |
|---|---|---|---|
| Al | 2520 | Cu | 2566 |
| Cr | 2672 | Pd | 2964 |
| Fe | 2862 | Mn | 2368 |
| Co | 2928 | V | 3653 |
| Ni | 2914 | B | 2823 |

Table 2 shows various starting materials whose constituents are controlled to form a quasi-crystalline aluminum alloy by a gas-phase reaction of aluminum and alloy elements, and the compositions of qc-APs derived from such starting materials. In each of chemical formulas, units of numerical values are atomic %. The same is true of those described hereinafter. In Table 2, the abbreviation "bal" represents "balance", and the composition in parentheses indicates a specific example.

TABLE 2

| Material | qc-AP |
|---|---|
| $Al_{bal}\ Pd_{40-50}$ | $Al_{bal}\ Pd_{20-30}$ <br> $(Al_{75}Pd_{25})$ |
| $Al_{bal}\ Cu_{5-20}Fe_{10-30}$ | $Al_{bal}\ Cu_{18-23}Fe_{13-15}$ <br> $(Al_{65}Cu_{20}Fe_{15})$ |
| $Al_{bal}\ Cu_{5-10}Co_{40-50}$ | $Al_{bal}\ Cu_{15-20}Co_{15-20}$ <br> $(Al_{65}Cu_{20}Co_{15})$ |
| $Al_{bal}\ Pd_{40-50}TE_{1-10}$ | $Al_{bal}\ Pd_{15-30}TE_{\leq17}$ <br> $(Al_{72}Pd_{20}Cr_8,\ Al_{70}Pd_{17}Fe_{13},$ <br> $Al_{75}Pd_{15}Co_{10},\ Al_{70}Pd_{20}Mn_{10})$ |
| $Al_{bal}\ Pd_{40-50}TE_{1-10}B_{1-20}$ | $Al_{bal}\ Pd_{15-30}TE_{\leq17}B_{\leq10}$ <br> $(Al_{64}Pd_{15}Mn_{15}B_6)$ |
| $Al_{bal}\ Ni_{25-35}Co_{40-50}$ | $Al_{bal}\ Ni_{10-15}Co_{15-20}$ <br> $(Al_{70}Ni_{15}Co_{15})$ |

In Table 2, each of the qc-Aps of the Al-Cu-Fe, Al-Cu-Co, Al-Pd-Mn, Al-Pd-Mn-B and Al-Ni-Co systems has a stable phase.

One example of a starting material containing V is $Al_{bal}\ V_{50-70}Cu_{5-20}$. The qc-APs produced from this material have a composition represented by $Al_{bal}\ V_{13-17}Cu_{15-20}$. A particular example thereof is $Al_{65}V_{15}Cu_{20}$.

In Table 2, $Al_{bal}\ Pd_{40-50}Fe_{5-10}$ is included in the Al-Pd-TE based starting materials, and $Al_{bal}\ Pd_{13-17}Fe_{13-17}$ is produced from this starting material. $Al_{bal}\ Pd_{40-50}Mn_{1-3}$ is also included in the Al-Pd-TE based starting materials, and $Al_{bal}\ Pd_{18-24}Mn_{8-10}$ is produced from this material.

The qc-Aps of the Al-Pd, Al-Cu-Fe, Al-Cu-Co, and Al-Pd-TE systems in the various aforementioned qc-APs are effective catalysts, because their specific surface area is greatly increased by the extreme reduction in particle size, and because they contain Pd or Cu, which have a catalytic capabilities.

Table 3 shows the melting points of various quasi-crystalline aluminum alloy ultra fine particles (qc-APs).

TABLE 3

| qc-AP | Melting point (K.) |
|---|---|
| Al—Pd system | 1100 |
| Al—Cu—Fe system | 1135 |
| Al—Cu—Ca system | 1100 |
| Al—Pd—Mn system | 1100 |
| Al—Cu—Cr system | 1100 |

Table 4 shows the crystallization temperatures Tx of qc-APs of the Al-Pd-TE system.

TABLE 4

| qc-AP | Crystallization temperature Tx(K.) |
|---|---|
| $Al_{72}Pd_{20}Cr_8$ | 940 |
| $Al_{70}Pd_{17}Fe_{13}$ | 870 |
| $Al_{75}Pd_{15}Co_{10}$ | 890 |

As apparent from Tables 3 and 4, each of the various types of qc-APs has an excellent high temperature stability, because it has a high melting point, or has a high crystallization temperature Tx and is maintained as a quasi-crystalline structure, until it reaches such temperature. All of the usual amorphous aluminum alloys have crystallization temperatures Tx in the range of 473 to 573 K and therefore lack high temperature stability.

If an aggregate of qc-APs is subjected to a specific surface area increasing treatment which permits a portion of at least one of aluminum and an alloy element to be selectively eluted, the catalytic activity of the qc-AP can be further enhanced. In this case, the regular 20-hedral structure of the qc-AP has a large interaction and hence, the qc-APs resulting from the treatment retains a skeleton structure.

$Al_{64}Pd_{15}Mn_{15}B_6$ (listed in Table 2) is particularly effective for use, as a magnetic material, $Al_{70}Ni_{15}Co_{15}$ (also listed in Table 2) is an effective catalyst material, particularly in a hydrogenating reactions. Further, the qc-APs of the Al-V-Cu system may be used as a catalyst material, for example, in a methanol decomposing reaction. It is known that the alloy of the Al-V-Cu system has an amorphous phase forming ability and is phase-transformed from an amorphous phase to a quasi-crystalline phase by a thermal treatment. Depending upon the producing conditions, qc-APs having mixed-amorphous and quasi-crystalline phases are produced and have a high catalytic activity.

In producing qc-APs, a process is employed which comprises melting a starting material by plasma arc in an atmosphere containing a gas inert to aluminum and the alloy element or elements, thereby realizing the evaporation of a large number of clusters having a quasi-crystalline aluminum alloy composition and the subsequent formation of spherical droplets by aggregation of the clusters.

Figure 1B:
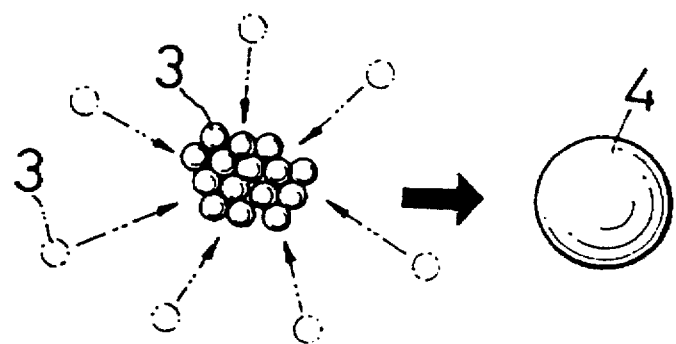
FIG. 1B is a diagram for illustrating the formation of droplets in the mechanism for forming the quasi-crystalline aluminum alloy ultrafine particles.

FIGS. 1A and 1B illustrate a mechanism of forming qc-APs in such producing process.

Referring to FIG. 1A, when the material 1 is melted by plasma arc using an electrode 2 in an atmosphere containing an inert gas G, the gas G is dissociated into an atomic form ($G^+$) by the arc plasma and is dissolved into a molten material 1 and then released in the form of a molecule (G) out of the material 1. In such a manner, the dissolution and release are repeated. During this release, a large number of clusters 3 are actively evaporated. The cluster 3 has a quasi-crystalline aluminum alloy composition containing aluminum and alloy elements. This is attributable to the fact that the evaporation speeds of the aluminum and alloy elements are relatively approximate to one another because of the relationship of their boiling points as described above.

Referring to FIG. 1B, the clusters 3 have substantially the same composition and hence, are aggregated, i.e., permitted to collide against one another for fusion and growth to form spherical droplets 4 having an ultrafine particle size of at most 200 nm. These spherical droplets 4 are cool to produce qc-APs.

Figure 2:
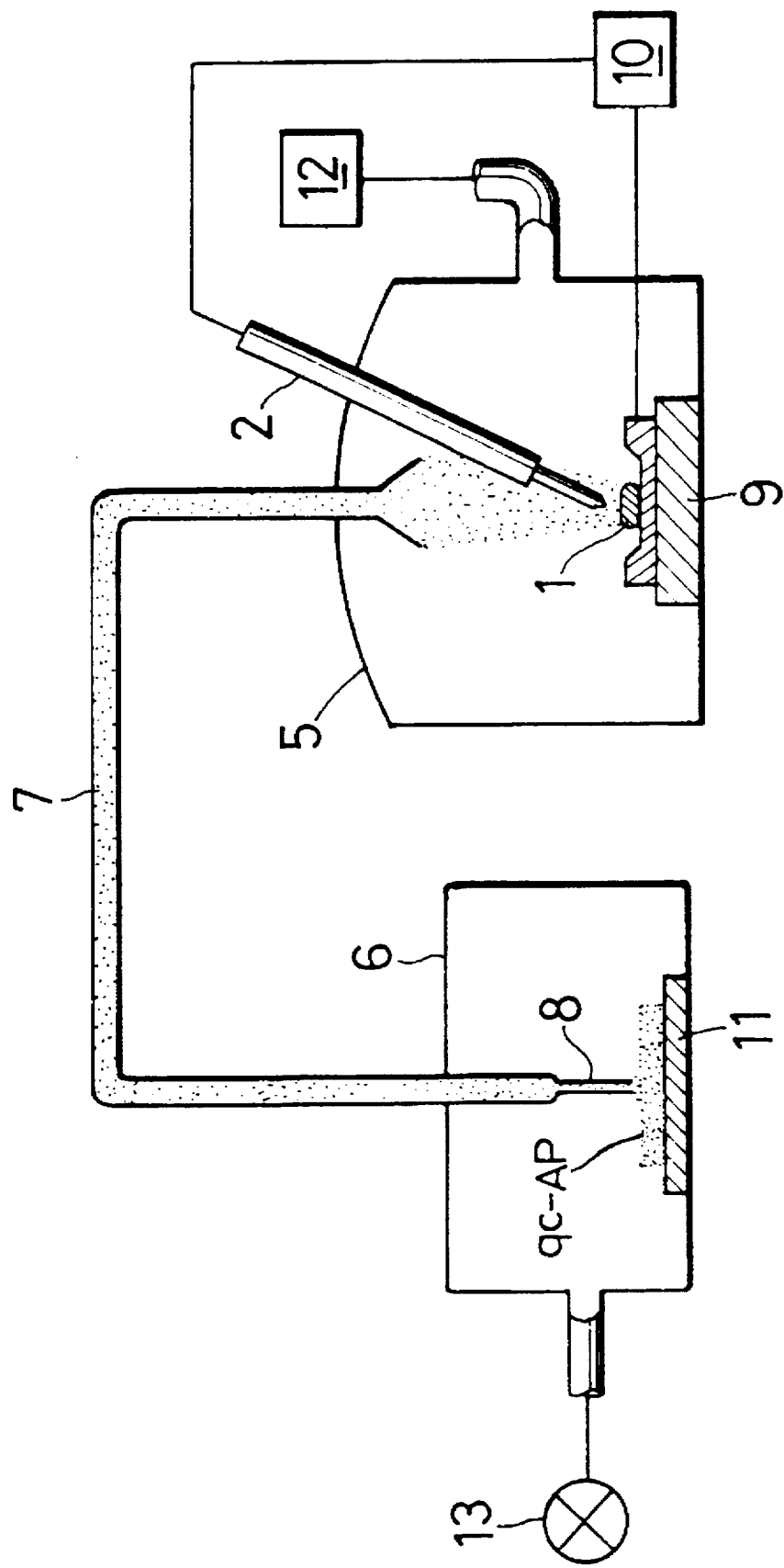
FIG. 2 is a diagrammatic illustration of an apparatus for producing an aggregate of quasi-crystalline aluminum alloy ultrafine particles.

A particular example will be described. FIG. 2 illustrates an apparatus used for production of a qc-AP aggregate. This producing apparatus includes a main chamber 5 and a subsidiary chamber 6 disposed sideways of the main chamber 5. Both of the chambers 5 and 6 communicate with each other through a duct 7 and a nozzle 8 mounted to a lower end of the duct 7. A tungsten electrode 2 inserted into the main chamber 5 and a Cu hearth 9 placed into the main chamber 5 are connected to a power source 10. A base plate 11 movable in longitudinal and lateral directions is disposed in the subsidiary chamber 6 and opposed to the nozzle 8. The main chamber 5 is connected to an inert gas supply source 12, while the subsidiary chamber 6 is connected to a vacuum pump 13.

An alloy material of $Al_{57.5}Pd_{42.5}$ is selected as an alloy starting material comprising aluminum (Al) and palladium (Pd). A mixed gas consisting of 50% by volume of argon gas and 50% by volume of nitrogen gas is used as a gas inert to the aluminum and palladium. In addition to this gas, nitrogen gas or argon gas can be used alone as such an inert gas, or argon gas containing 50% by volume or less of hydrogen gas likewise can be used.

An example of the production of qc-AP aggregate using the above-described producing apparatus now will be described. The qc-APs may be used as a catalyst material in a methanol decomposing reaction ($CH_3OH \rightarrow CO+2H_2$).

(1) 20 grams of the alloy material 1 of $Al_{57.5}Pd_{42.5}$ was placed on the hearth 9.

(2) The vacuum pump 13 was operated to evacuate the main and subsidiary chambers 5 and 6, until the internal pressure of the chambers 5 and 6 reached $1 \times 10^{-4}$ Torrs. Then, the inert gas supply source 12 was operated to supply the mixed gas into the main chamber 5. The mixed gas in the main chamber 5 is allowed to flow through the duct 7 and the nozzle 8 into the subsidiary chamber 6 and then flow out of the subsidiary chamber 6 by the operation of the vacuum pump 13. Therefore, the amount of mixed gas supplied from the inert gas supply source 12 was controlled such that the internal pressure of the main chamber 5 became a steady state of 100 to 200 Torrs.

(3) A voltage was applied between the tungsten electrode 2 and the hearth 9 to generate an arc discharge, thereby melting the alloy starting material 1 by plasma arc under the condition of an arc current of 100 to 300 A. This melting caused the clusters 3 of the quasi-crystalline aluminum alloy composition containing the aluminum and palladium to be evaporated and aggregated to form spherical droplets 4, as described above in connection with FIGS. 1A and 1B. Then, the spherical droplets 4 were cooled to form qc-APs. The qc-APs were ejected from the nozzle 8 through duct 7 onto the base plate 11 and deposited thereon, thereby providing an aggregate of qc-APs having a particle size d in a range represented by $d \leq 200$ nm. The qc-APs had a composition $Al_{75}Pd_{25}$, a melting point of 1100 K, a crystallization temperature Tx of 850 K and a specific surface area of 15 $m^2/g$.

The aggregate was subject to a specific surface area increasing treatment, i.e., immersed into a 10% solution of hydrochloric acid (HCl) and retained for 10 minutes, and aluminum was partially eluted to provide an aggregate. In this case, the interaction of the regular 20-hedral structure of the qc-APs was large and, therefore, quasi-crystalline aluminum alloy ultrafine particles of a skeleton structure (each of which will be referred to as "qc-APS" hereinafter) were produced by the acid treatment the gc-APS and had an increased specific surface area of 50 $m^2/g$.

Further, the aggregate was heated at 900 K for one hour to produce an aggregate of crystalline aluminum ultrafine particles (each of which will be referred to as "c-AP").

In addition, using pure palladium and pure copper as starting materials, an aggregate of crystalline palladium ultrafine particles (which will be referred to as "c-PP") and an aggregate of crystalline copper ultrafine particles (which will be referred to as "c-CP") were produced in the same manner as described above.

A MgO powder was selected as a carrier, and 10% by weight of each of the aggregates as catalyst materials was mixed with 90% by weight of the MgO powder. Then, each mixture was compacted to form a green compact having a diameter of 5 mm and thickness of 3 mm. The green compacts were subjected to a calcination at 500° C. for 5 hours. Thereafter, the calcined material was pulverized to provide five catalysts from the five different particles.

Using each of the catalysts, a test of estimation of catalyst activity in the methanol decomposing reaction was carried out. The test conditions were as follows: the supply rate of methanol was 0.02 cc/min; the carrier gas used was nitrogen gas; the supply rate of the carrier gas was 100 cc/min; the catalyst activity measuring temperature was in a range of 150° to 500° C.; and gas chromatography was used for analysis of the decomposed gas.

Figure 3:
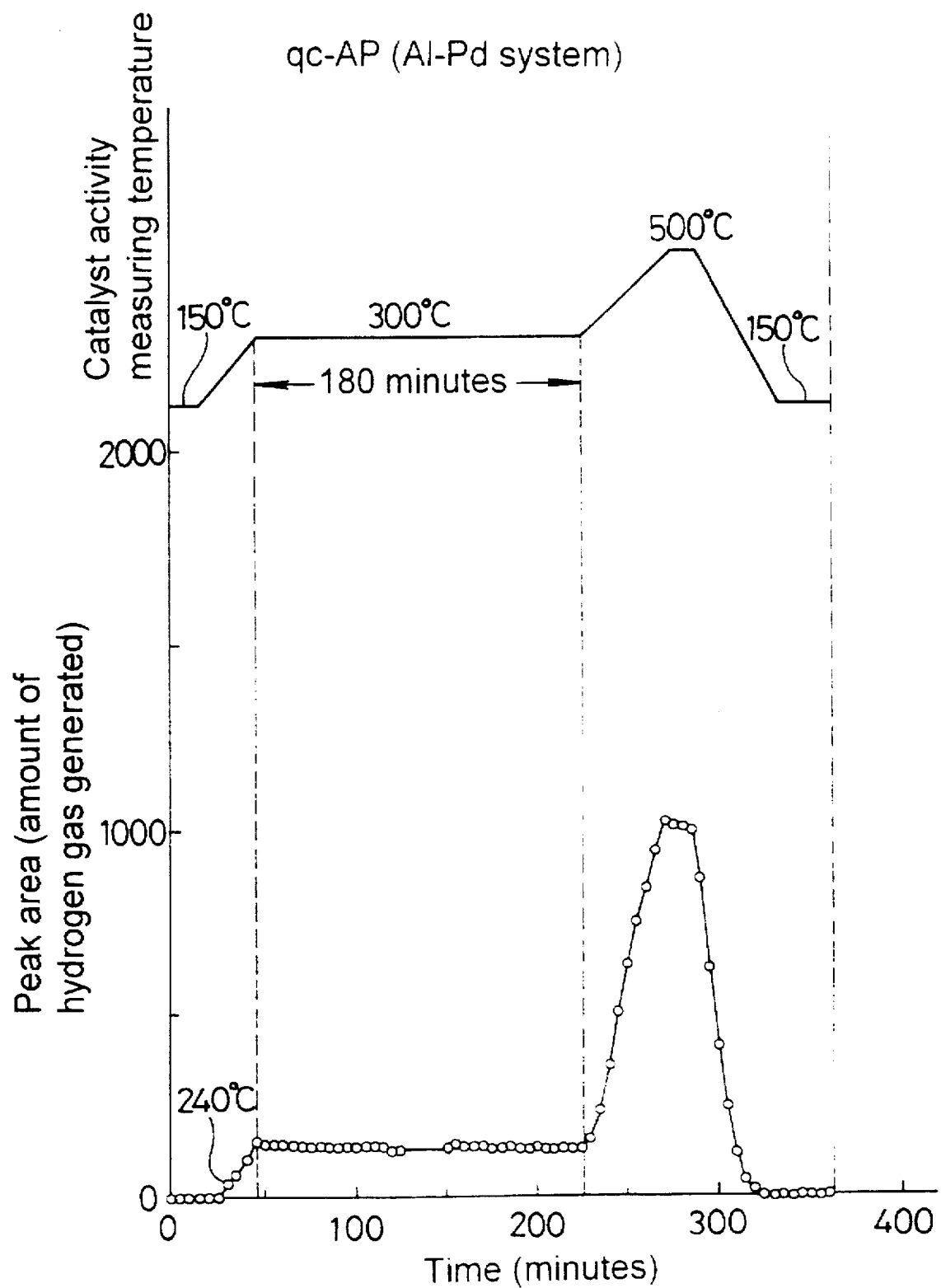
FIG. 3 is a graph illustrating a first example of the results of a catalyst activity estimating test.
Figure 4:
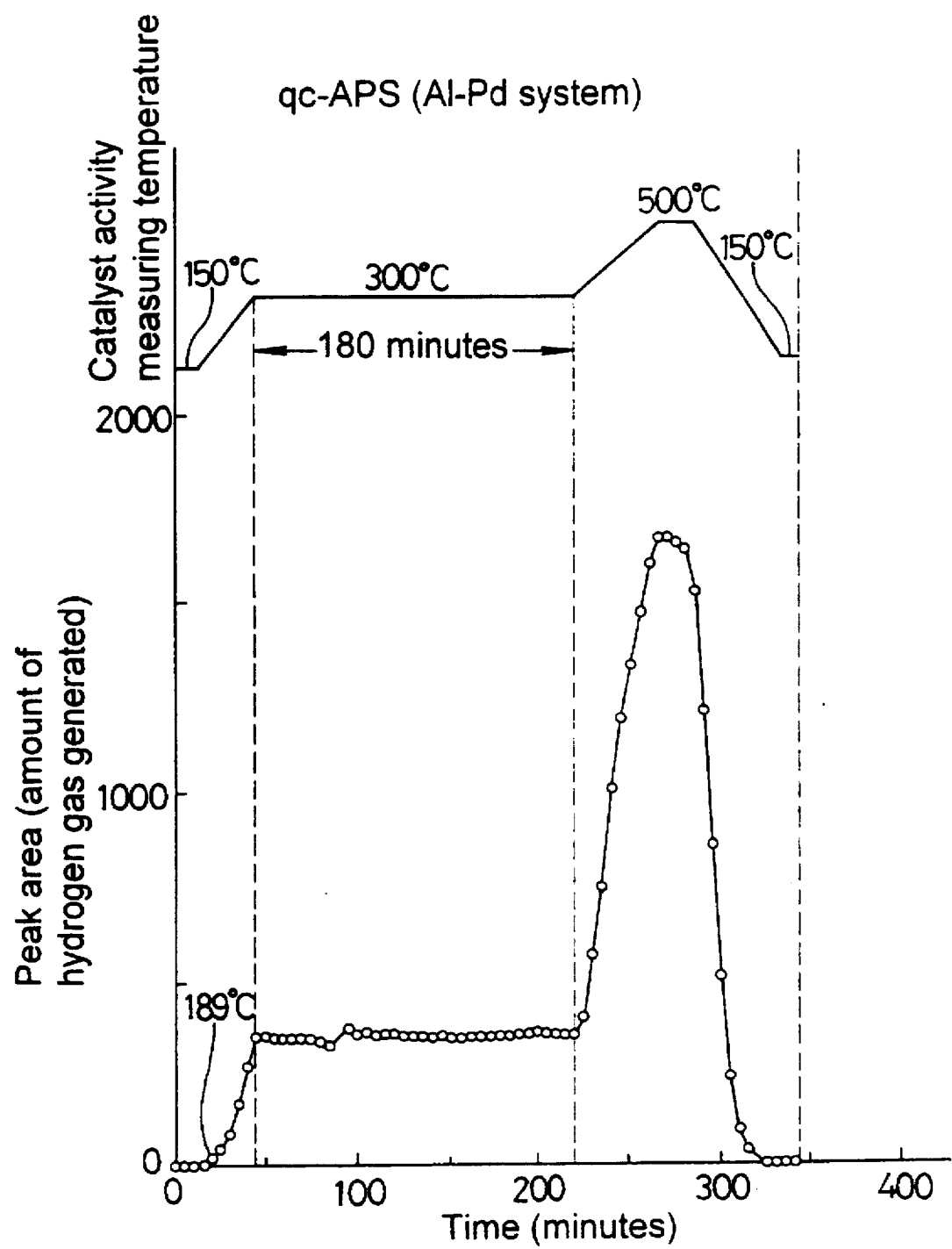
FIG. 4 is a graph illustrating a second example of the results of the catalyst activity estimating test.

FIGS. 3 to 7 illustrate the relationships between the time and the catalyst activity measuring temperature (150° C.→300° C.→500° C.→150° C.), and the peak area for hydrogen gas, i.e., the amount of hydrogen gas generated. The relationship between the ultrafine particles in the catalyst and each of the Figures to which they correspond is as follows; FIG. 3 in the case of qc-AP, FIG. 4 in the case of qc-APS, FIG. 5 in the case of c-AP, FIG. 6 in the case of c-PP and FIG. 7 in the case of c-CP.

Table 5 shows the hydrogen gas generation starting temperature, the amount of hydrogen gas generated at the time of reaching 300° C., and the amount of hydrogen gas generated after a lapse of 180 minutes from the time of reaching 300° C., corresponding to FIGS. 3–7.

TABLE 5

| Catalyst material | Hydrogen generation starting temperature (°C.) | Amount of hydrogen gas generated at the time of reaching 300° C. | Amount of hydrogen gas generated after a lapse of 180 minutes from the time of reaching 300° C. |
|---|---|---|---|
| qc-AP (Al—Pd system) | 240 | 142 | 124 |
| qc-APS (Al—Pd system) | 189 | 355 | 356 |
| c-AP (Al—Pd system) | 295 | 25 | 20 |
| c-PP (Pd system) | 214 | 104 | 88 |
| c-CP (Cu system) | 266 | 192 | 33 |

Figure 5:
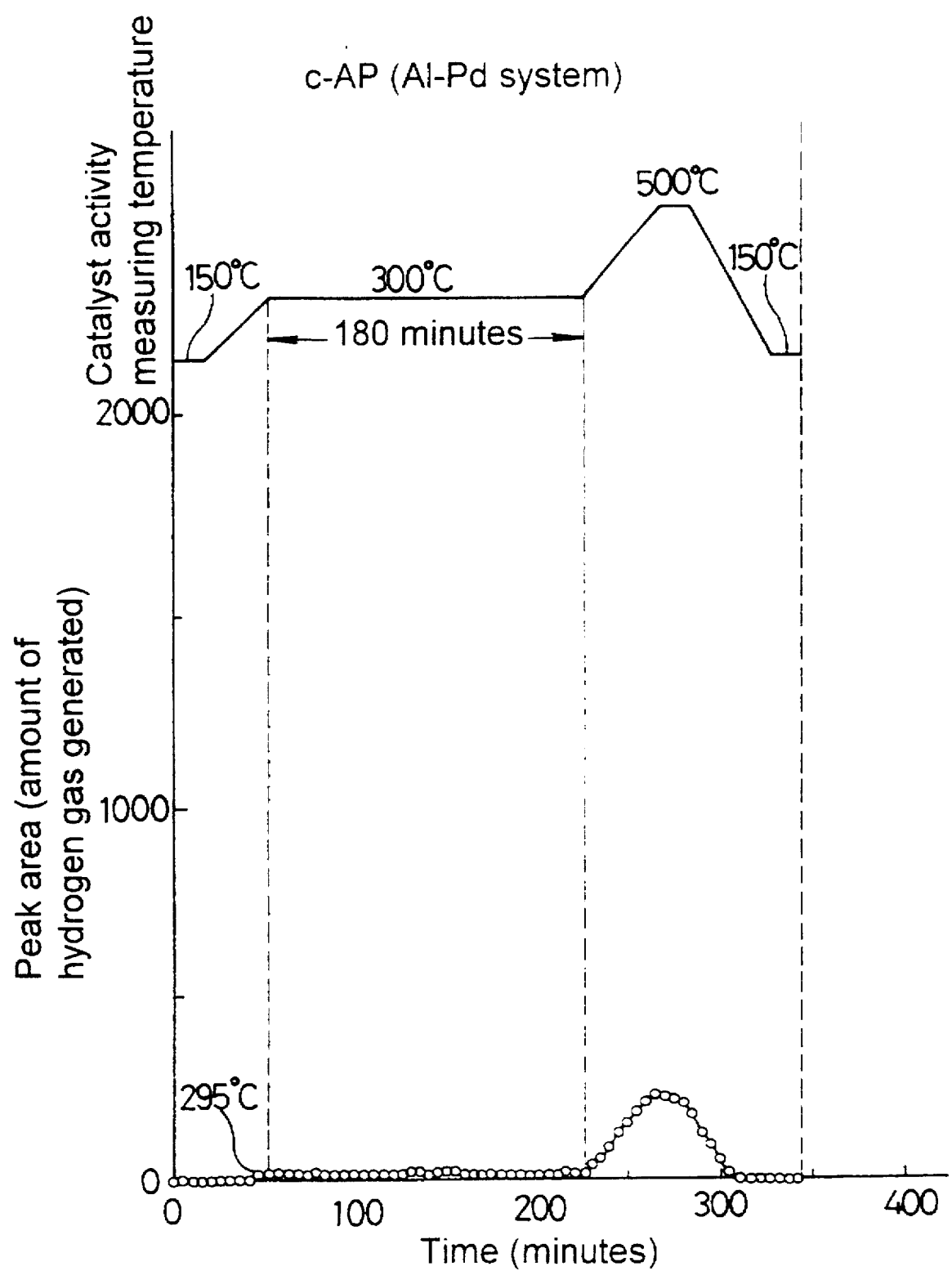
FIG. 5 is a graph illustrating a third example of the results of the catalyst activity estimating test.

It can be seen from FIGS. 3 and 5 and Table 5 that if the qc-APs are used as a catalyst material, the hydrogen gas generation starting temperature is low, and the amounts of hydrogen gas generated at the time of reaching 300° C. and after a lapse of 180 minutes from the time of reaching of 300° C. are large, as compared with the use of c-APs. The catalytic activity and the retention thereof are observed to be further enhanced in the case of the qc-APSs shown in FIG. 4. This is attributable to the fact that the specific surface area of the qc-APSs is increased up to 3.3 times that of the qc-APs.

Figure 6:
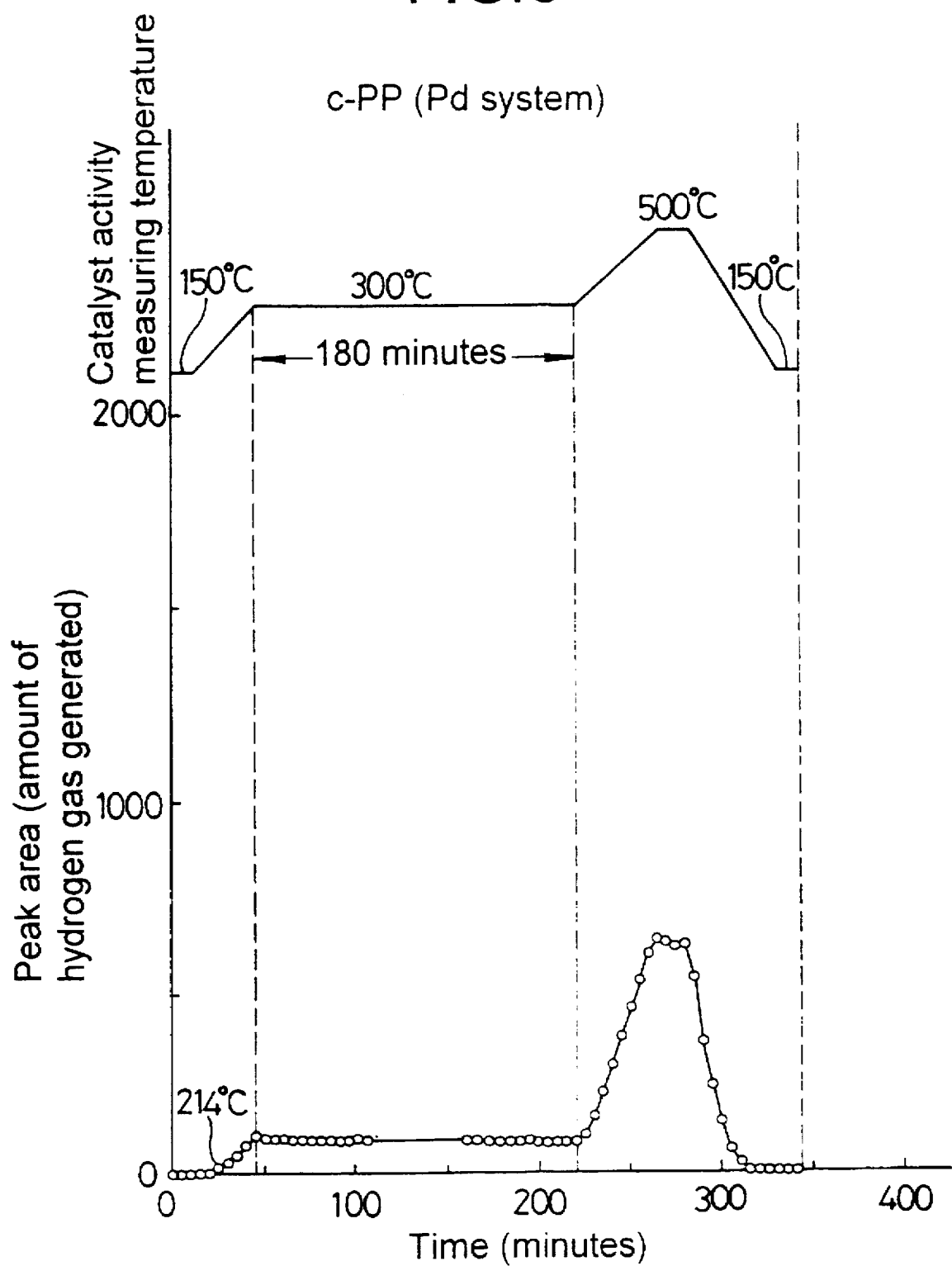
FIG. 6 is a graph illustrating a fourth example of the results of the catalyst activity estimating test.
Figure 7:
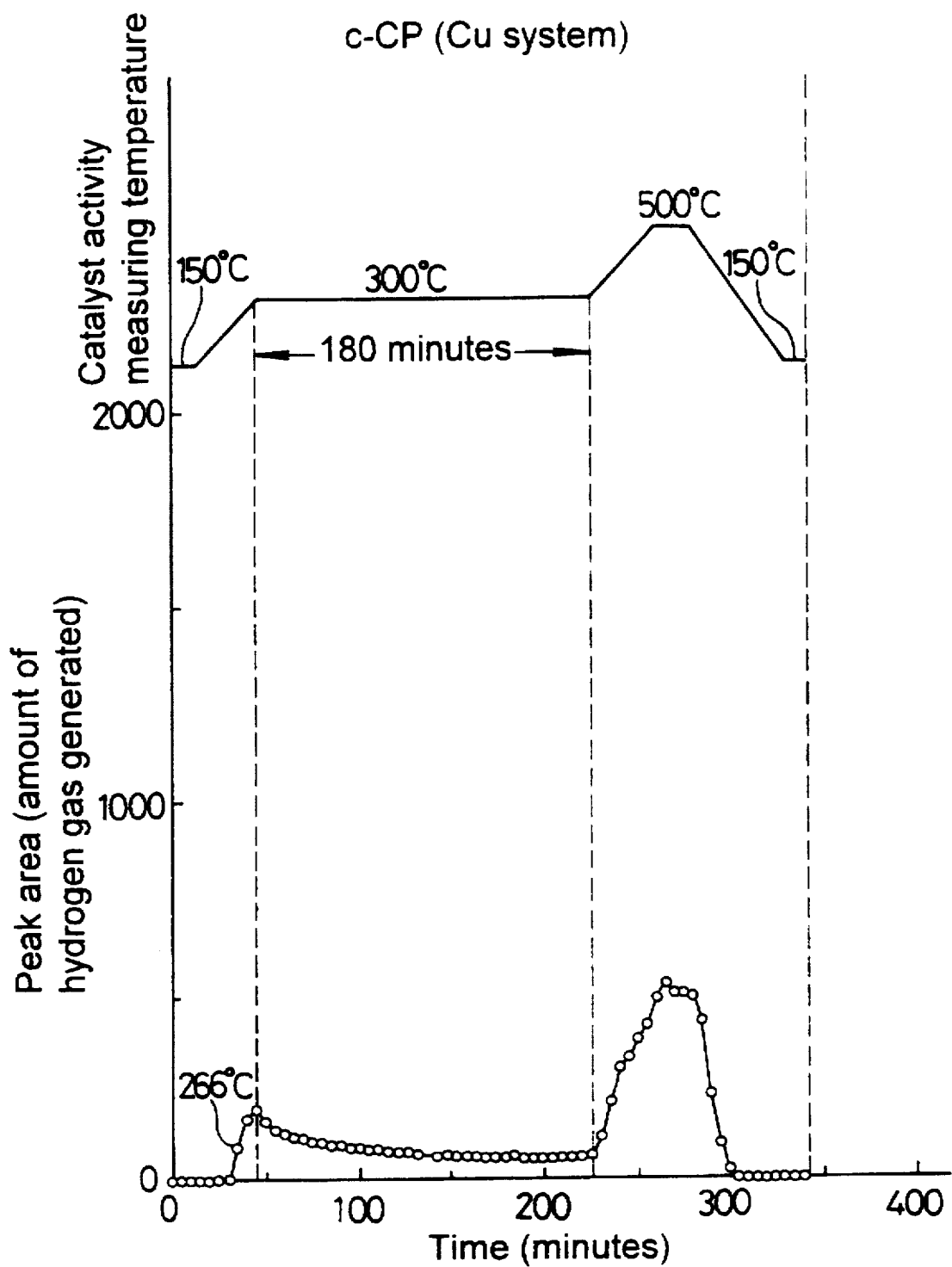
FIG. 7 is a graph illustrating a fifth example of the results of the catalyst activity estimating test.

In the case of the c-PPs shown in FIG. 6, the hydrogen gas generation starting temperature is relatively low, but the catalytic activity is poor. In the case of the c-CPs shown in FIG. 7, the hydrogen gas generation starting temperature is relatively high, and the retention of the catalytic activity is inferior to the qc-APs and qc-APSs.

Table 6 shows other catalyst materials of qc-APs of the Al-Cu-Fe, Al-Cu-Co and Al-Pd-TE systems and the catalytic activities of the materials in a catalytic activity estimation test similar to that described above.

TABLE 6

| Catalyst material (numerical values are by atomic %) | Hydrogen gas generation starting temperature (°C.) | Amount of hydrogen gas generated at the time of reaching 300° C. | Amount of hydrogen gas generated after a lapse of 180 minutes from the time of reaching 300° C. |
|---|---|---|---|
| $Al_{65}Cu_{20}Fe_{15}$ | 215 | 236 | 204 |
| $Al_{65}Cu_{20}Co_{15}$ | 239 | 268 | 260 |
| $Al_{72}Pd_{20}Cr_8$ | 239 | 196 | 187 |
| $Al_{70}Pd_{17}Fe_{13}$ | 215 | 134 | 102 |
| $Al_{75}Pd_{15}Co_{10}$ | 214 | 169 | 155 |
| $Al_{70}Pd_{20}Mn_{10}$ | 215 | 162 | 159 |

It is apparent from Table 6 that the qc-APs having the other compositions have excellent catalytic activity and retention thereof, as do those described above.

Figure 8:
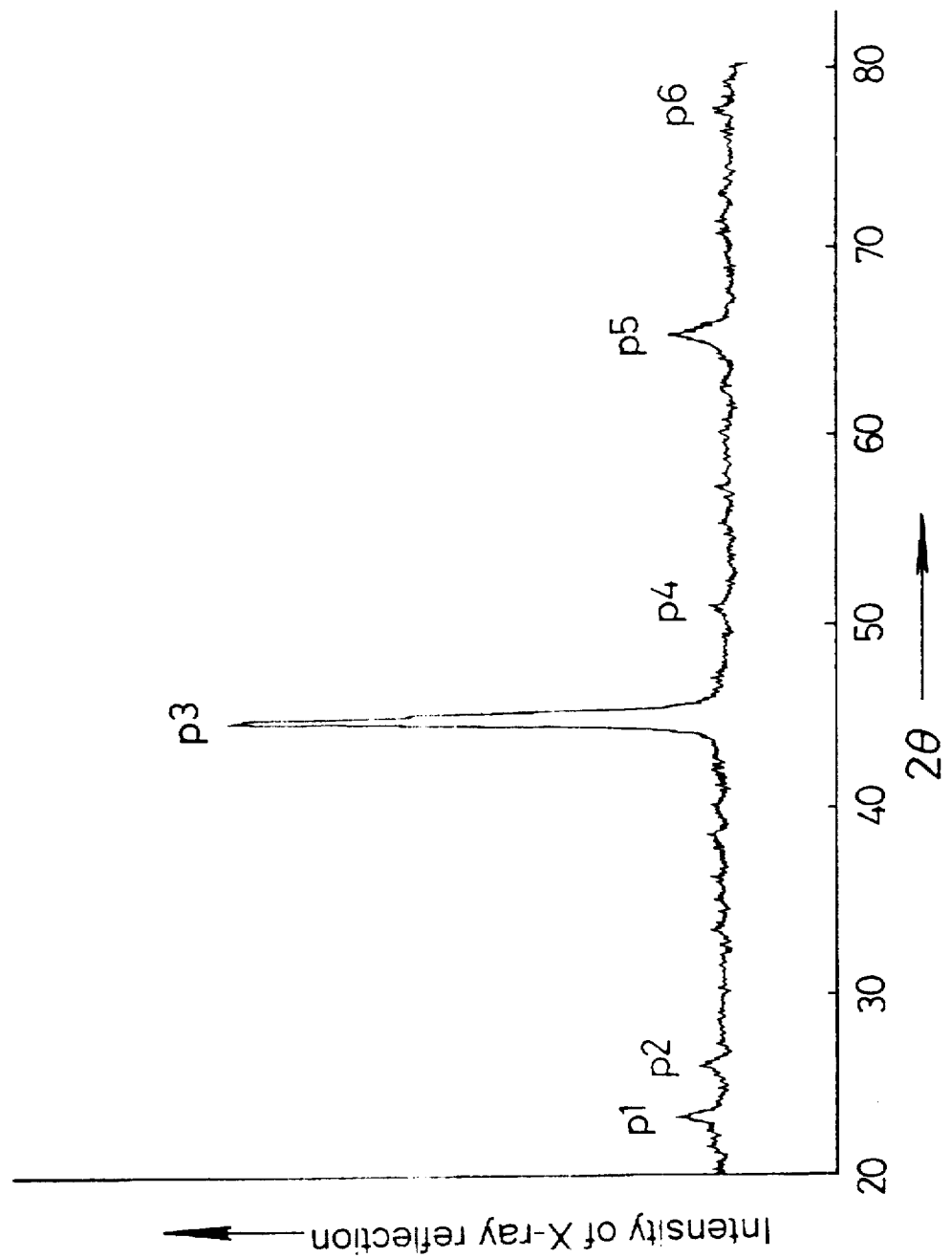
FIG. 8 is an X-ray diffraction pattern for the quasi-crystalline aluminum alloy ultrafine particles.

FIG. 8 shows results of an X-ray diffraction for qc-APs having a composition of $Al_{70}Ni_{15}Co_{15}$.

Figure 9:
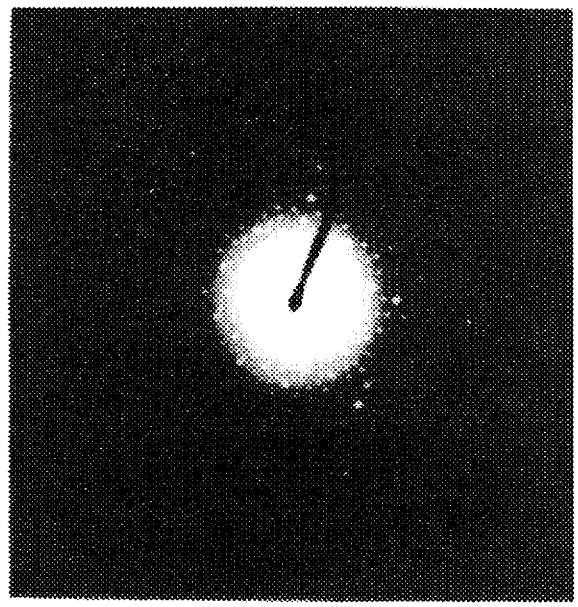
FIG. 9 is an electron diffraction photograph for quasi-crystalline aluminum alloy ultrafine particles.

In FIG. 8, peaks p1 to p6 appear at given locations of 2θ and, therefore, it is apparent that the qc-APs are of a quasi-crystalline aluminum alloy. FIG. 9 shows an electronic diffraction pattern indicating a quasi-crystalline structure of qc-APs having the above-described composition ($Al_{70}Ni_{15}Co_{15}$), wherein a black linear portion resulted from the projection of a portion of the apparatus. In FIG. 9, an arrangement of diffraction points forming small white spots is observed.

While specific embodiments of quasi-crystalline aluminum alloys and a specific process for making same have been described to illustrate the invention; those skilled in the art will readily recognize that other similar alloys and process are within the scope of the invention as defined by the following claims.

What is claimed is:

1. Ultrafine quasi-crystalline aluminum alloy particles, said ultrafine quasi-crystalline particles being produced by subjecting a plurality of starting particles of a quasi-crystalline aluminum alloy having a particle size d≦200 nm, and a composition consisting of palladium (Pd) in an amount represented by 20 atomic %≦Pd≦30 atomic % and a balance of aluminum, to a leaching treatment to thereby elute aluminum from said starting particles, wherein as a result of said leaching treatment said ultrafine quasi-crystalline particles retain a skeleton structure of said starting particles, and said ultrafine quasi-crystalline particles have a specific surface area greater than that of said starting particles, and wherein in a methanol decomposition reaction said ultrafine quasi-crystalline particles have a substantially reduced hydrogen generating starting temperature than that of said starting particles, the rate of hydrogen production at 300° C. is substantially greater than that for said starting particles, and the rate of hydrogen production at 300° C. is substantially maintained by said quasi-crystalline particles for at least 180 minutes after reaching 300° C.

2. Ultrafine particles of a quasi-crystalline aluminum alloy according to claim 1, wherein said ultrafine particles have a composition of $Al_{75}Pd_{25}$ (each of the numerical values are by atomic %) and are useful as a catalyst material in a methanol decomposing reaction.

3. Ultrafine quasi-crystalline aluminum alloy particles, said ultrafine quasi-crystalline particles being produced by subjecting a plurality of starting particles of a quasi-crystalline aluminum alloy having a particle size d≦200 nm, and a composition consisting essentially of palladium in the amount represented by 15 atomic %≦Pd≦30 atomic %, a transition element other than Pd in an amount equal to or less than 17 atomic %, and a balance of aluminum, to a leaching treatment to thereby elute aluminum from said starting particles, wherein as a result of said leaching treatment said ultrafine quasi-crystalline particles retain a skeleton structure of said starting particles, and said ultrafine quasi-crystalline particles have a specific surface area greater than that of said starting particles, and wherein in a methanol decomposition reaction said ultrafine quasi-crystalline particles have a substantially reduced hydrogen generating starting temperature than that of said starting particles, the rate of hydrogen production at 300° C. is substantially greater than that for said starting particles, and the rate of hydrogen production at 300° C. is substantially maintained by said quasi-crystalline particles for at least 180 minutes after reaching 300° C.

4. Ultrafine particles of a quasi-crystalline aluminum alloy according to claim 3, wherein said ultrafine particles have a composition selected from the group consisting of $Al_{72}Pd_{20}Cr_8$, $Al_{70}Pd_{17}Fe_{13}$, $Al_{75}Pd_{15}Co_{10}$ and $Al_{70}Pd_{20}Mn_{10}$ (each of the numerical values in each of chemical formulas is by atomic %), and said ultrafine particles are useful as a catalyst material.

5. Ultrafine quasi-crystalline aluminum alloy particles, said ultrafine quasi-crystalline particles being produced by subjecting a plurality of starting particles of a quasi-crystalline aluminum alloy having a particle size d≦200 nm, and a composition consisting essentially of palladium (Pd) in an amount represented by 15 atomic %≦Pd≦30 atomic %, a transition element other than Pd in an amount ≦17 atomic %, boron in an amount greater than zero and ≦10 atomic %, and a balance of aluminum, to a leaching treatment to thereby elute aluminum from said starting particles, wherein as a result of said leaching treatment said ultrafine quasi-crystalline particles retain a skeleton structure of said starting particles, and said ultrafine quasi-crystalline particles having a specific surface area greater than that of said starting particles, and wherein in a methanol decomposition reaction said ultrafine quasi-crystalline particles have a substantially reduced hydrogen generating starting temperature than that of said starting particles, the rate of hydrogen production at 300° C. is substantially greater than that for said starting particles, and the rate of hydrogen production at 300° C. is substantially maintained by said quasi-crystalline particles for at least 180 minutes after reaching 300° C.

6. Ultrafine particles of a quasi-crystalline aluminum alloy according to claim 5, wherein said ultrafine particles have a composition of $Al_{64}Pd_{15}Mn_{15}B_6$ (each of the numerical values is by atomic %) and are useful as a magnetic fluid material.

7. Ultrafine quasi-crystalline aluminum alloy particles produced by subjecting a plurality of starting particles of a quasi-crystalline aluminum alloy including Pd and optionally at least one alloy element selected from the group of V, Cr, Mn, Fe, Co, Ni, and Cu and having a particle size d≦200 nm to a leaching treatment to thereby elute aluminum from said starting particles, wherein as a result of said leaching treatment said ultrafine quasi-crystalline particles retain a skeleton structure of said starting particles, and said ultrafine quasi-crystalline particles have a specific surface area greater than that of said starting particles, and wherein in a methanol decomposition reaction said ultrafine quasi-crystalline particles have a substantially reduced hydrogen generating starting temperature than that of said starting particles, the rate of hydrogen production at 300° C. is substantially greater than that for said starting particles, and the rate of hydrogen production at 300° C. is substantially maintained by said quasi-crystalline particles for at least 180 minutes after reaching 300° C.

8. Ultrafine quasi-crystalline aluminum alloy particles according to claim 7, wherein said starting particles include Pd and at least one other of said alloy elements.

9. Ultrafine quasi-crystalline aluminum alloy particles according to claim 7 or 8, wherein the combined concentration of said Pd and said alloying elements included in said starting particles is in a range of 20 to 36 atom %.

* * * * *